Jan. 7, 1941. A. W. MALL Re. 21,684
VIBRATOR
Original Filed Nov. 30, 1934
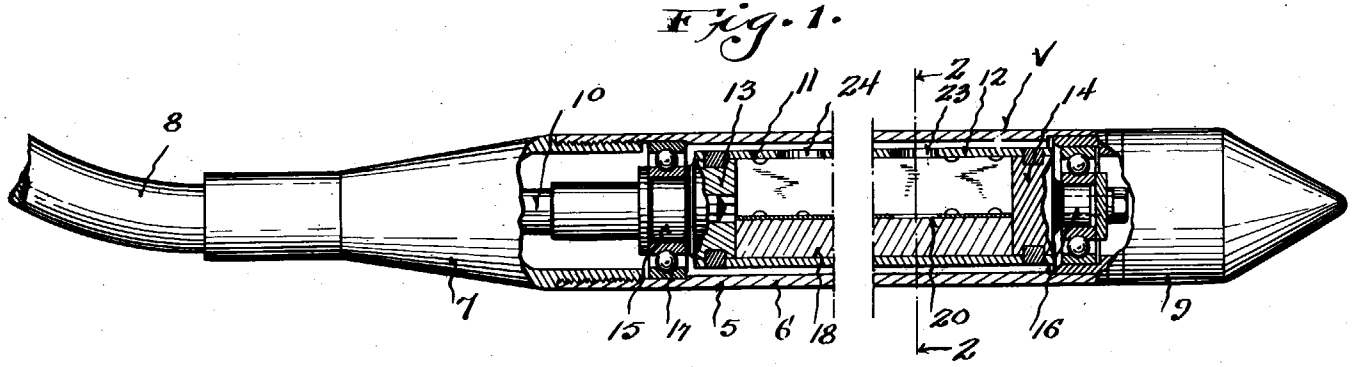
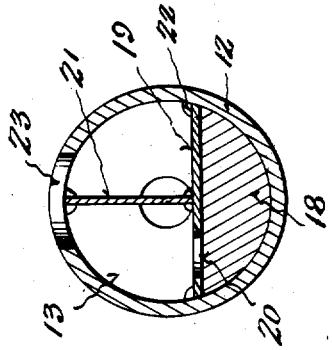
Inventor
Arthur W. Mall —
By Young & Young
Attorneys Reissued Jan. 7, 1941

Re. 21,684

UNITED STATES PATENT OFFICE 21,684

VIBRATOR

Arthur William Mall, Flossmoor, Ill.

Original No. 2,073,393, dated March 9, 1937, Serial No. 755,462, November 30, 1934. Application for reissue March 6, 1939, Serial No. 260,976

10 Claims. (Cl. 259—1)

This invention pertains to forming of concrete, and like plastic structures, and more particularly to a novel device for setting up vibrations in the concrete incident to the placing thereof in the forms for building walls, dams, and so forth.

It has been proposed to submerge, or partially submerge, a device having unbalanced weights therein for setting up vibrations in the plastic mass to facilitate the correct placing thereof in the form and in close contact with the walls thereof, and the reinforcing members (when utilized). In all of these devices, with which I am familiar, the weights are located at one end of the device, and thus the vibrations do not tend to radiate from the entire length of the tool, but only at the point of location of the weights and the weights tend to bow the shaft.

It is therefore one of the salient objects of my invention to provide a vibrator for concrete and like plastic masses, embodying an elongated cylindrical vibratory member, including a non-rotatable outer housing rotatably supporting an internal rotatable member extending longitudinally of the housing with an unbalanced weight carried by the member extending the full length thereof.

A further object of my invention is to provide, in a vibrator of the type mentioned above, a vibratory element comprising an elongated rotatable mass of high specific gravity, so disposed as to produce maximum vibrational effect per unit of mass, and to reduce to a minimum all mass having a counter balancing effect with respect to the vibration producing portion of the mass.

Another important object of my invention is to provide in a vibrator of the type mentioned above, a vibratory element incorporating, as the vibration producing medium, a material having a maximum specific gravity irrespective of its tensile strength and rigidity, and including, in addition to such material, a supporting structure of material having maximum strength and rigidity irrespective of its specific gravity, and adapted to completely support the mass of high specific gravity eccentrically of the axis of rotation for rapid revolution in an orbit around said axis, without allowing the mass to bow outwardly under the effect of centrifugal force.

The invention further aims, in this respect, to provide a vibrator having an outer casing of minimum diameter and a rotating, eccentric vibratory element having a maximum ratio of weight and eccentric displacement of its center of gravity from the axis of rotation, in proportion to its over-all diameter. This is accomplished by achieving a close spacing of the radially outer extremity of the vibratory element from the inner surface of the casing, and providing for minimum flexure of the vibratory element in proportion to the centrifugal force produced therein, so as to avoid rubbing of the vibratory element against the interior of the casing.

Another object of the invention is to provide, for an agitator of the type set forth above, a novel rotor or vibratory element having means for eccentrically supporting a mass of high specific gravity and low tensile strength and rigidity, so constructed and arranged as to provide for convenient introduction of the mass thereinto, as, for example, by pouring of the mass while in a molten state.

A further object of my invention is the provision of a removable wear-end for the tool, so that the same can be replaced as the same is worn incident to the repeated use of the tool within the concrete masses.

With these and other objects in view, the invention consists in the novel construction, arrangement, and formation of parts, as will be herein-after more specifically described, claimed, and illustrated in the accompanying drawing, in which drawing:

Figure 1 is a side elevation of my improved vibrator, with parts thereof broken away and in section to illustrate structural details.

Figure 2 is a detail transverse section through the rotor, taken on the line 2—2 of Figure 1, but on a larger scale.

Referring to the drawing in detail, wherein similar reference characters designate corresponding parts throughout the several views, the letter V generally indicates my improved vibrator, which comprises an elongated cylindrical housing 5, preferably formed from steel, or similar hard metal. This housing 5 includes an intermediate tubular or sleeve-like section 6, having threaded on the inner end thereof the head 7, which receives the flexible drive shaft 8. The outer end of the sleeve 6 detachably receives the penetrating point 9, which may or may not be provided with fins. This point can be threaded on the sleeve, or otherwise detachably secured in place, as may be preferred.

The penetrating point is also formed of hard material, and can be renewed as the same becomes worn, incident to the continued placing of the tool in the concrete masses. The casing of the flexible shaft can be readily secured to the head 7, and the rotating cork 10 thereof extends into the tool and is detachably connected with the rotor 11. The formation of the rotor 11 forms one of the salient features of my invention, and includes a cylindrical tube or sleeve 12 formed of hard metal, such as steel. This sleeve or tube 12 is of less diameter than the casing sleeve 6, and has firmly anchored in the ends thereof heads 13 and 14 provided with axially disposed stub shafts or spindles 15 and 16. These spindles are rotatably supported in anti-friction bearings, such as ball bearing races 17. The heads 13 and 14 of the cylindrical tube or sleeve 12 can be welded, soldered, or otherwise secured in place.

Extending longitudinally of the rotor is the lead weight 18, and it is to be noted that this weight is disposed entirely at one side of the axle center of the rotor. This lead weight 18 is placed within the rotor in a novel manner and is firmly anchored in place in a novel manner, with the anchoring means forming a reinforcement for the rotor.

In accordance with my invention I provide a steel reinforcing rib or plate 19, which extends across the tube or sleeve 12 of the rotor, at one side of the longitudinal axis thereof. This steel plate, web, or rib can abut the end heads 13 and 14, and the same is provided with an orifice 20, the purpose of which will be later set forth.

A second longitudinally extending reinforcing plate or web 21 is provided. This web extends diametrically of the tube 12, and from one end of the same to the other, and the heads 13 and 14 are adapted to abut up against the ends thereof when the heads are placed in position. This reinforcing plate 21 engages the central portion of the plate 19, and the inner face of the tube 12. The reinforcing plates 19 and 21 are secured together, and to the inner face of the sleeve or tube 12, by welding, or by the use of solder 22.

Directly in line with the opening 20 the sleeve or tube 12 is provided with an opening 23, and the sleeve or tube can be provided with another opening 24 at a point spaced from the opening 20.

After the reinforcing plates 19 and 21 have been placed within the sleeve 12, and the end heads 13 and 14 have been anchored in place, the lead is introduced into the sleeve between the inner face thereof and the reinforcing plate 19, in a molten condition. A cone can be placed through the opening 20, so that the molten lead can be conveniently poured within the compartment defined by the reinforcing plate 19 and the inner face of the sleeve or tube 12. The opening 24 in the sleeve or tube constitutes a vent for hot vapors incident to the pouring of the metal in place. Obviously, the molten metal will fill up the entire space between the reinforcing plate 19 and the inner surface of the tube, and the same will closely adhere to the plate and to the tube. The reinforcing plate 19 constitutes an effective means for holding the lead 18 in place, and also constitutes a brace for the tube or sleeve 12. The provision of the web or plate 21 insures the rigidity of this structure.

By disposing the lead weight 18 longitudinally of the rotor, I am enabled to place the entire mass of the weight at one side of the axis of the rotor, and thus all dead or counter-balancing weight is eliminated. This insures a maximum amount of kick throughout the entire length of the vibrator. Not only am I enabled to obtain a maximum amount of kick throughout the length of the vibrator, but I am enabled to effectively decrease the diameter of the vibrator, and thus the vibrator can be effectively used in confined places.

By the use of the combination steel and lead rotor, the bending of the rotor is prevented, and thus all danger of the rotor contacting with the casing of the vibrator is prevented.

The vibrator can be effectively used with concrete, which would ordinarily be designated as dry concrete, and the tool is very effective for the treating of concrete in situ at points that are inaccessible for ordinary placing operation.

While I have stated that my improved tool is adapted to be submerged, or partially submerged, in the concrete mass, it is understood that good results can be obtained from the use thereof by clamping the same to the sides of the concrete mass.

The flexible shaft 8 can be driven from any preferred type of a prime mover, such as an electric motor, internal combustion engine, and so forth.

Changes in details may be made without departing from the spirit or scope of my invention, but what I claim as new is:

1. A vibrator for concrete wark comprising an elongated casing adapted to be totally immersed in the concrete, an elongated rotor supported internally of said casing including a cylindrical hollow housing, an elongated weight in said housing extending the full length thereof and located entirely at one side of the axial center thereof, and a reinforcing plate extending across the housing and anchored thereto and fitted against said weight.

2. A vibrator for concrete work comprising an elongated casing, an elongated rotor mounted within said casing, said rotor including a hollow housing formed of hard metal, and a lead weight extending longitudinally of the housing disposed at one side of the longitudinal axis thereof, and means for anchoring the weight in the housing, said anchoring means including reinforcing plates.

3. A rotor for vibrators comprising an elongated hollow cylindrical housing of hard metal, a reinforcing plate arranged internally of the housing extending from one side thereof to the other and disposed on one side of the longitudinal axis of the housing defining in conjunction with the housing a compartment, said reinforcing plate having an opening therein, a second diametrically extending reinforcing plate secured to the housing and to the first plate, said housing having an opening in line with the first-mentioned opening, and lead received within said compartment, the lead being introduced through said opening in a molten condition in the compartment.

4. A rotor for concrete vibrators comprising an elongated sleeve of hard metal, a reinforcing plate extending across the sleeve and secured to the inner face thereof and disposed at one side of the longitudinal axis of the housing, said plate in conjunction with the sleeve defining a compartment, a second reinforcing plate secured to the inner face of the sleeve of the central portion of the first-mentioned plate, the sleeve and the first-mentioned plate being provided with openings, heads rigidly secured to the ends of the sleeve and abutting the ends of the plates, and a lead weight in said compartment, the lead being introduced in a molten condition through the openings.

5. In a vibrator for concrete work comprising a stator including an elongated casing, a sleeve, a removable penetrating point detachably carried by the outer end of the casing, a sleeve, a head detachably connected with the inner end of the sleeve, a flexible drive shaft including a casing and a drive core, the casing being connected with the head, a rotor mounted within the stator and operatively connected to the core; said rotor including a tubular housing of hard metal, and an elongated weight arranged within the casing at one side of the longitudinal axis thereof.

6. A vibrator for concrete work comprising an elongated cylindrical casing adapted to be totally submerged in the concrete work, said casing having a shell member internally threaded at both ends, a flexible drive casing screw-threadedly secured to one end, a pointed penetrating member secured to the other end, a pair of bearings, a rotor in said shell mounted in said bearings, said rotor having a tubular member, end closure members engaging said bearings and an offset lead weight therein, a plate mounted in said tubular member forming a confined space, said lead weight in said space, said lead adapted to be poured into said space in a molten state and said plate and tubular member having aligned openings to permit introduction of said lead.

7. A vibrator for concrete work comprising an elongated cylindrical casing adapted to be totally submerged in the concrete work, said casing having a shell member internally threaded at both ends, a flexible drive casing screw-threadedly secured to one end, a pointed penetrating member secured to the other end, a pair of bearings, a rotor in said shell mounted in said bearings, said rotor having a tubular member, end closure members engaging said bearings and an offset lead weight therein, a plate mounted in said tubular member forming a confined space, said lead weight in said space, said lead adapted to be poured into said space in a molten state, said plate and tubular member having aligned openings to permit introduction of said lead, and said plate having a second opening to permit egress of hot vapors during the lead filling action.

8. A high speed vibrator for compacting concrete, comprising an elongated casing having a cylindrical internal surface, adapted to be immersed in the concrete, and an axially elongated rotor comprising a tubular high strength supporting shell journalled in said casing at axially spaced regions for rotation on an axis coaxial with that of the casing and having a lateral wall region closely adjacent the inner surface of the casing, said rotor being, intermediate said journal regions, of such axial length in proportion to its diameter as to develop in its intermediate region, under normal operating conditions, high centrifugal loads tending to deflect said intermediate region away from the axis of rotation, and a vibration producing mass of material having high specific gravity, mounted within said shell in contact with the inner surface of said lateral wall region, in a position of eccentricity to the axis of rotation, and thereby supported against lateral yielding under the effect of centrifugal force.

9. A high speed vibrator for compacting concrete, comprising an elongated casing having a cylindrical internal surface, adapted to be immersed in the contrete, and an axially elongated rotor comprising a tubular high strength supporting shell journalled in said casing at axially spaced regions for rotation on an axis coaxial with that of the casing and having a cylindrical lateral outer surface closely adjacent the inner surface of the casing, said rotor being, intermediate said journal regions, of such axial length in proportion to its diameter as to develop in its intermediate region, under normal operating conditions, high centrifugal loads tending to deflect said intermediate region away from the axis of rotation, and a vibration producing mass of material having high specific gravity mounted within said shell in contact with the inner surface of said lateral wall region, in a position of maximum eccentricity to the axis of rotation, and thereby supported against lateral yielding under the effect of centrifugal force.

10. A high speed vibrator for compacting concrete, comprising an elongated casing having a cylindrical internal surface, adapted to be immersed in the concrete, and an axially elongated rotor comprising a tubular high strength steel supporting shell journalled in said casing for rotation on an axis coaxial with that of the casing and having a lateral wall region closely adjacent the inner surface of the casing and a vibration producing mass of lead, mounted within said shell in contact with the inner surface of said lateral wall region, in a position of eccentricity to the axis of rotation, and thereby supported against lateral yielding under the effect of centrifugal force.

ARTHUR WILLIAM MALL.